Patented June 12, 1945

2,378,328

UNITED STATES PATENT OFFICE 2,378,328

MEANS AND METHOD OF IDENTIFYING MANUFACTURED PRODUCTS

Elmer Robinson, Concord, and Robley D. Evans, Belmont, Mass.

No Drawing. Application May 22, 1942, Serial No. 444,156

13 Claims. (Cl. 250—106)

The present invention relates to means and methods for identifying manufactured products, and more particularly, though not exclusively, for the identification of glass both before and after it is manufactured into lenses.

Heretofore it has been very difficult and often impossible for manufacturers and users of lenses to identify with certainty the glass supplied to the lens manufacturer, or the rough blank or semi-finished or finished lens in the hands of the purchaser or user. As a result, lens manufacturers may be supplied by unscrupulous manufacturers and dealers with glass of inferior quality, and similarly, lenses made from inferior glass may be passed off on the public in place of glass of superior quality produced by manufacturers of high standing and reputation.

Ordinarily, it is impossible to determine the origin or manufacture of a lens except by tests and measurements with delicate and expensive instruments by persons trained and experienced in the use thereof.

Attempts in the past to devise some simple, inexpensive and unobjectionable method or means for identifying with certainty the glass or lens have been unsatisfactory, inasmuch as they either involve changes or alterations in the characteristics of the glass or lens which interfere with its intended use, or impair the appearance or function of the lens, or require the use of special and expensive apparatus.

It is the object of the present invention to provide a manufactured product and more especially a glass which will involve no appreciable increase in the cost, which retains all the essential and advantageous characteristics secured by the high standards of manufacture, which introduces no objectionable features, and which may be easily and quickly identified by simple tests with relatively inexpensive instruments.

Another object of the present invention is to devise a process for the manufacture of such product or glass.

With these objects in view, the present invention consists in the addition to the manufactured product of suitable radio-active material in such quantity and of such kind that its presence may be determined for long periods thereafter by suitable simple tests. In the case of glass for ophthalmic lenses or the like, the radio-active material is introduced when the glass is being manufactured and its characteristics are such that the rays emanated therefrom will have no harmful effect upon the human body, and especially upon the eyes. It has been definitely determined that the gamma rays, when of limited intensity, are harmless to the human body. The added radio-active material, therefore, will be such that the rays emanated therefrom are primarily of the gamma type, with no other rays of harmful intensity. Among the suitable substances emanating such gamma rays are long-lived radio-active cobalt and manganese.

In carrying out the present invention radio-active material, in the form of an isotope of cobalt or manganese, may be added to the other materials commonly used in glass manufacture, such as silica, soda, lime, magnesia, etc. before they are subjected to the high temperature necessary to fuse and melt them together, or if desired, this radio-active material may be added to the molten mass. The proportional amounts to be added will vary with the particular material employed, and also will depend upon the desired intensity of the radiation. For example, it has been found that for 600 pounds of glass, the addition of 10 millicuries of radio-active cobalt, identified by the symbol $Co^{60}$, gave an intensity of radiation of gamma rays which, while harmless to human beings, was easily determined by suitable test, and persisted for relatively long periods of time, i. e. ten years or longer. This proportion would be ½ microcurie of cobalt ($Co^{60}$) per fifteen gram ophthalmic lens blank. No color would be imparted to the glass by this radio-active material, nor would its optical characteristics be in any way altered or impaired.

A suitable test for determining the presence or absence of the radio-active material is the well-known Geiger-Muller counter, but any other satisfactory method may be employed.

If the use of such radio-active material is restricted to those glass manufacturers who maintain high standards of quality, lens purchasers may determine for themselves whether or not the lens blanks which they have purchased are from one or another of such manufacturers. So also may the purchaser or user of the semi-finished or finished lens determine, or have determined for him, whether or not his lens is of this high standard quality of glass.

If it is desired to distinguish between the products of the several high quality manufacturers who identify their glass by the presence of radio-active material, each of such manufacturers may be restricted to a particular radio-active material which shall emit the radiation but nevertheless shall have its own particular and individual characteristics determinable by test. Thus a lens manufacturer, purchaser, or user may not only determine whether or not his glass and lens are the product of a certain group of manufacturers known to maintain the highest standards, but may also determine which member of this group is the manufacturer of a particular sample of glass or lens. Thus the product of manufacturer A, who may use as his radioactive material cobalt, may be clearly distinguished from the product of manufacturer B who employs manganese as his radio-active material. These two substances, while both emitting gamma rays, are distinguishable for the reason that every radio-active substance emits radiations, the energy and spectral characteristics of which distinguish it uniquely from all other radio-active material.

In the foregoing specification the invention has been described more particularly in connection with glass designed especially for ophthalmic lenses, but in its broader aspects it is not to be limited to this particular product as it is applicable to all manufactured products. Nor is it essential in the practice of the present invention that the radio-active material be introduced into and form a part of such product, as it is within the scope of the present invention to add such identifying material to the finished product as, for example, by applying thereto a paint or other coating containing the radio-active material.

While in the foregoing specification and in the appended claims certain materials such as cobalt and manganese have been specifically mentioned, it is to be understood that the present invention and claims are not limited to such specific materials except where so particularly set forth. In its broader aspects the present invention covers any radio-active material within the scope and the language of the claims, which may be added to the glass or any other material, whereby the same may be identified.

Having thus described the invention, what is claimed is:

1. An article of manufacture for use in proximity to the human body, said article carrying a detectable amount of radioactive material whereby such article may be identified, and said material emitting only rays of low intensity innocuous to the human body.

2. A glass article for use near the human body, said article containing radioactive material emitting rays capable of detection by non-destructive methods and innocuous to the human body.

3. A lens of glass for use in proximity to the human eye, said lens containing radioactive material which emits rays of predetermined limited intensity harmless to the human eye.

4. A lens of glass for use in proximity to the human body, said lens containing radioactive material which emits only rays of low intensity innocuous to the human body, said rays comprising predominantly gamma rays.

5. An ophthalmic lens of glass containing radio-active cobalt which emits only rays of low intensity innocuous to the eye.

6. An ophthalmic lens of glass containing radio-active manganese which emits only rays of low intensity innocuous to the human eye.

7. The method of manufacturing an identifiable article for use in proximity to the human body which consists in adding to the article radio-active material which emits only rays of low intensity innocuous to the human body.

8. The method of making an identifiable glass for lenses and the like for use in proximity to the human body which consists in incorporating in the glass radio-active material which emits only rays of low intensity innocuous to the human body.

9. The method of making an identifiable glass for lenses and the like for use in proximity to the human eye which consists in incorporating in the glass radio-active cobalt which emits only rays of low intensity innocuous to the eye.

10. The method of distinguishing glass produced by different manufacturers which consists in adding to the glass radio-active material which produces predominantly innocuous gamma rays of low intensity, different materials having rays of different characteristics being used by different manufacturers.

11. The method of identifying glass to be used in proximity to the human body which consists in adding to the glass in the process of manufacture radio-active material having such characteristics and in such amounts that the rays emitted are innocuous to the human body and of low intensity, and detecting the presence of such material by non destructive methods.

12. The method of making an identifiable glass for lenses and the like to be used in proximity to the human body which consists in incorporating in the glass a detectable amount of radioactive manganese which emits only rays of low intensity innocuous to the human body.

13. An ophthalmic lens blank containing radioactive cobalt ($Co^{60}$) in the proportion of substantially one-half microcurie of cobalt per fifteen gram lens blank.

ELMER ROBINSON.
ROBLEY D. EVANS.